(12) United States Patent
Gillie

(10) Patent No.: US 7,378,155 B2
(45) Date of Patent: May 27, 2008

(54) URETHANE BASED COATING APPLIED IN-LINE FOR IMPROVED INK ADHESION

(75) Inventor: James Kevin Gillie, Middletown, DE (US)

(73) Assignee: Applied Extrusion Technologies, Inc., New Castle, DE (US)

(*) Notice: Subject to any disclaimer, the term of this patent is extended or adjusted under 35 U.S.C. 154(b) by 468 days.

(21) Appl. No.: 10/803,360

(22) Filed: Mar. 18, 2004

(65) Prior Publication Data

US 2004/0191529 A1 Sep. 30, 2004

Related U.S. Application Data

(60) Provisional application No. 60/457,473, filed on Mar. 25, 2003.

(51) Int. Cl.
*B32B 27/32* (2006.01)
*B32B 27/40* (2006.01)

(52) U.S. Cl. .............. 428/424.8; 428/424.2; 428/523

(58) Field of Classification Search ............ 428/423.1, 428/424.8, 424.2, 523
See application file for complete search history.

(56) References Cited

U.S. PATENT DOCUMENTS

| | | |
|---|---|---|
| 4,086,317 A | 4/1978 | Miyabe |
| 4,214,035 A | 7/1980 | Heberger |
| 4,225,644 A | 9/1980 | Tsuchiya et al. |
| 4,233,352 A | 11/1980 | Ono et al. |
| 4,241,144 A | 12/1980 | Hendy |
| 4,268,583 A | 5/1981 | Hendy |
| 4,367,112 A | 1/1983 | Park |
| 4,371,489 A | 2/1983 | McGrail |
| 4,388,258 A | 6/1983 | Hungerford |
| 4,403,464 A | 9/1983 | Duncan |
| 4,410,600 A | 10/1983 | McGrail |
| 4,457,254 A | 7/1984 | Hungerford |
| 4,481,058 A | 11/1984 | Park |
| 4,515,863 A | 5/1985 | Caines |
| 4,517,363 A | 5/1985 | D'Alelio et al. |
| 4,525,419 A * | 6/1985 | Posey et al. ............... 428/336 |
| 4,629,657 A | 12/1986 | Gulati et al. |
| 4,642,263 A | 2/1987 | Culbertson |
| 4,851,166 A | 7/1989 | Kendall |
| 4,880,695 A | 11/1989 | Rudd et al. |
| 4,923,713 A | 5/1990 | Rudd et al. |
| 4,956,241 A | 9/1990 | Chu et al. |
| 4,981,758 A | 1/1991 | Chu et al. |
| 5,017,430 A | 5/1991 | Chu et al. |
| 5,077,353 A | 12/1991 | Culbertson |
| 5,156,904 A | 10/1992 | Rice et al. |
| 5,166,242 A | 11/1992 | Chu et al. |
| 5,175,054 A | 12/1992 | Chu |
| 5,182,168 A | 1/1993 | Chu et al. |
| 5,188,867 A | 2/1993 | Chu et al. |
| 5,192,620 A | 3/1993 | Chu et al. |
| 5,212,012 A | 5/1993 | Culbertson |
| 5,212,260 A | 5/1993 | Culbertson |
| 5,215,817 A | 6/1993 | Chu |
| 5,275,886 A | 1/1994 | Chu et al. |
| 5,298,325 A | 3/1994 | Culbertson |
| 5,302,327 A | 4/1994 | Chu et al. |
| 5,350,601 A | 9/1994 | Culbertson et al. |
| 5,424,120 A | 6/1995 | Culbertson |
| 5,453,326 A | 9/1995 | Siddiqui |
| 5,525,421 A | 6/1996 | Knoerzer |
| 5,824,394 A * | 10/1998 | Kinoshita et al. ........ 428/195.1 |
| 5,985,437 A | 11/1999 | Chappell, Jr. et al. |
| 6,020,412 A | 2/2000 | Muschelewicz et al. |
| 6,485,817 B1 | 11/2002 | DeMeuse |
| 6,514,625 B1 | 2/2003 | DeMeuse |
| 2002/0098340 A1 | 7/2002 | Servante et al. |
| 2004/0053064 A1 | 3/2004 | Masuda et al. |

FOREIGN PATENT DOCUMENTS

| | | |
|---|---|---|
| EP | 0 214 790 A2 | 3/1987 |
| EP | 0 329 377 A2 | 8/1989 |
| WO | WO 0231016 A1 | 4/2002 |
| WO | WO 02/092671 A1 | 11/2002 |

OTHER PUBLICATIONS

International Search Report, dated Aug. 24, 2004, for International Application No. PCT/US2004/008801.

* cited by examiner

*Primary Examiner*—Thao Tran
(74) *Attorney, Agent, or Firm*—Caesar, Rivise, Bernstein, Cohen & Pokotilow, Ltd.

(57) ABSTRACT

A printable, coated, biaxially oriented film is provided that includes a polypropylene base film having a first and a second side, and a urethane coating on the first side. The coating has been applied to the base film between a machine direction orientation and a transverse direction orientation of a two step tentering operation. A method for manufacturing the film is also provided which includes the steps of forming a base film of a substantially uniform film layer of polypropylene, uniaxially orienting the base film by machine direction stretching, applying a coating of urethane to a first side of the uniaxially oriented base film, and biaxially orienting the coated film by stretching the film transversely to the machine direction.

23 Claims, No Drawings

URETHANE BASED COATING APPLIED IN-LINE FOR IMPROVED INK ADHESION

CROSS-REFERENCE TO RELATED APPLICATION

This application claims priority to U.S. Provisional Application No. 60/457,473, entitled Urethane Based Coating Applied In-Line for Improved Ink Adhesion, filed Mar. 25, 2003.

BACKGROUND OF THE INVENTION

The present invention relates to a biaxially oriented laminated polypropylene (BOPP) film having a printable urethane coating.

BOPP films are widely used films because they have good stiffness, strength, optical properties (low haze and high gloss), and moisture barrier properties. Users of such films are continually seeking structures with improved printability. Because of their olefinic nature, typical BOPP constructions have low surface energy and require treatment (corona, flame, etc.) in order to be printable.

Urethane dispersions and blends of urethane dispersions and acrylic dispersions are known to function as useful primers for coatings and inks. Commercial products are available. In general, primers are materials that have low glass transition temperatures (Tg), the use of which often results in heavily blocked rolls. Films produced in a standard coating operation using the waterborne urethane dispersions without a topcoat result in a very tacky film that blocks on the machine winder and renders the roll unusable. The present invention is directed to a film where a low Tg coating is provided without the blocking tendency.

Waterborne acrylic dispersions blended with waterborne urethane dispersions are excellent coatings for printing using a variety of inks and also have good water resistance properties. These coating formulations typically require the addition of crosslinking agents (crosslinkers), for example, at 3-5% by weight, in order to harden the coating to pass ice chest and pasteurization tests. Crosslinking agents often hydrolyze in the mixed batch. This hydrolyzation requires additional work for a coating operation in that small batches must be mixed or the batch must be re-inoculated with the crosslinking agent when ready to be used. Additionally, if the formulation is created incorrectly, one may get unwanted crosslinking reactions causing the mixed material to be useless. Elimination or reduction of the crosslinking agent is desired.

The present invention is directed to a film and a method for making the film that resolves the above-stated issues.

Related prior art patents include the following:

U.S. Pat. No. 4,525,419 (1985) describes a primer coated, oriented plastic (PET) film where the primer is a waterborne copolyester dispersion. The resultant primed plastic film is disclosed as having improved adhesion to aqueous and solvent based coatings that are applied to the film. The coating may be applied before the film is stretched or after the film is uniaxially stretched, but before the film is stretched in the transverse direction.

U.S. Pat. No. 4,225,644 (1980) teaches a method of applying in-line coatings to oriented polypropylene film. The properties generated are lubricity, anti-blocking, and anti-scratch.

U.S. Pat. Nos. 5,156,904 (1992) and 5,453,326 (1995) demonstrate application of polyethyleneimine and polyamido-polyethyleneimine to improve extrusion lamination and ink adhesion. Both patents use in-line coating technology on polyester film.

All references cited herein are incorporated herein by reference in their entireties.

BRIEF SUMMARY OF THE INVENTION

Waterborne urethane dispersions and urethane dispersion blends with waterborne acrylic dispersions are shown to be excellent receptive surfaces for a variety of inks if applied as in-line coatings (as compared with out-of-line coatings). Relevant ink systems include, for example, solvent based gravure and flexographic inks, water based flexographic inks, lithographic inks, and UV inks. The in-line coating is applied between the machine direction orientation (MDO) and the transverse direction orientation (TDO) of a standard two step tentering operation for the production of oriented thermoplastic films. The advantage of applying these coatings in-line include reduction of blocking tendency, improvement in water resistance of printed samples, and reduction or elimination of use of a crosslinking agent.

The present invention is directed to a printable, coated, biaxially oriented film, which includes a base film having a first and a second side. The base film is constructed from polypropylene and has a urethane coating on the first side. The coating is applied to the base film between a machine direction orientation and a transverse direction orientation of a two step tentering operation.

The base film may additionally include a base film antiblock agent, present at, for example, up to 1% by weight of the film, or more preferably, up to 0.5% by weight of the film. The base film antiblock agent is silica-based, silicone-based, or is a blend of a silica-based agent and a silicone-based agent.

The urethane coating is preferably a waterborne urethane dispersion. Alternatively, the urethane coating may be a waterborne urethane dispersion blended with waterborne acrylic dispersions. The urethane coating may include a crosslinking agent, present, for example, at up to 1% by dry weight of the coating. The cross linking agent may be, for example, polyfunctional aziridine crosslinking agent at up to 1% by dry weight of the coating.

The urethane coating may include a coating antiblock agent at, for example, up to 1%, based on dry component weight. The coating antiblock agent may be, for example, silica-based, silicone-based, or may be a blend of a silica-based agent and a silicone-based agent.

The film may have a surface treatment on the first side beneath the urethane coating. Preferably, the surface treatment is an oxidative treatment. The film may also have a surface treatment on the second side. Again, preferably, the surface treatment is an oxidative treatment.

The polypropylene may be, for example, a polypropylene homopolymer, a copolymer of propylene, or a blend of homopolymers and copolymers. The base film may further include reclaimed material.

The base film may be a coextruded structure, for example, having at least three layers, or, for example, may include a core and at least one skin layer. The base film may be an extruded film that has an additional layer added by extrusion coating.

A method for manufacturing a printable polypropylene film is also provided which includes the steps of forming a base film comprising a substantially uniform film layer comprising polypropylene, and uniaxially orienting the base film by machine direction stretching of the base film. A coating of urethane is applied to a first side of the uniaxially oriented base film and the coated film is biaxially oriented by stretching the film transversely to the machine direction. The base film may include an antiblock agent present at, for example, up to 1% by weight of the film, and, preferably present at up to 0.5% by weight of the film.

The base film antiblock agent may be a silica-based antiblock agent, a silicone-based antiblock agent, or may be a blend of a silica-based agent and a silicone-based agent. The coating may be, for example, a waterborne urethane dispersion or a waterborne urethane dispersion blended with waterborne acrylic dispersions.

The coating of urethane may include a crosslinking agent, for example, a crosslinking agent present at up to 1% by weight of the coating. The crosslinking agent may be, for example, a polyfunctional aziridine crosslinking agent at approximately 1% by dry weight of the coating.

The method may include a step of surface treating the first side prior to the step of applying the coating of urethane. This step may include oxidatively treating the first side. The method may also include the step of surface treating the second side using, for example, oxidative treating.

The base film may include, for example, polypropylene homopolymers, propylene copolymers, or a blend of homopolymers and copolymers. The base film may include reclaimed materials.

The step of forming the base film may include coextruding the base film, for example, a three layer base film, or a base film having a core and at least one skin layer. The step of forming the base film may also include forming an extruded film that has an additional layer added by extrusion coating.

DETAILED DESCRIPTION OF THE INVENTION

The present invention is directed to coatings of waterborne urethane dispersions or waterborne urethane dispersions blended with waterborne acrylic dispersions that provide a surface on oriented polypropylene that is receptive to a variety of inks including solvent based flexographic and gravure printing inks, water based flexographic inks, lithographic inks, and UV screen inks. The coatings are preferably applied in-line on a standard film tenter between the MDO and the TDO. These coatings can be applied to, for example, clear or voided (opaque) thermoplastic films. The coatings also demonstrate excellent water resistance, as shown, for example, by a water immersion test at 0° C. and a pasteurization test at 82.5° C.

"Polypropylene" is intended to include, for example, polypropylene (including polypropylene homopolymers) and propylene heteropolymers. The term "propylene heteropolymers" is intended to include polymers of propylene with at least one other α-olefin, preferably $C_2C_3$ copolymers with less than 10% by weight $C_2$, or $C_3C_4$ copolymers with less than 30% $C_4$. The term "polypropylene homopolymers" is intended to include copolymers of polypropylene wherein the amount of ethylene does not adversely affect crystallinity.

Testing has shown that the urethane dispersions or waterborne urethane dispersions blended with waterborne acrylic dispersions must be applied in line between a machine direction orientation and a transverse direction orientation of a two step tentering operation. To demonstrate the advantage of this in-line coating process, a series of samples was prepared for comparison purposes using an off-line roll coating process on a pilot coater laminator (a standard roll coater having a direct gravure coating system and standard floatation dryer, manufactured, for example, by Faustel, Inc.). The surface to be coated was corona treated. Three coating formulations, which had previously been demonstrated to successfully pass various ink testing when applied as in-line coatings (according to the present invention), were coated onto the base film. After coating, the film was dried at standard conditions and at two additional conditions representing higher temperatures and extended drying/heating time. All of the off-line coated samples failed to pass the ink adhesion tests. Additionally, all of the off-line coated samples showed a strong blocking tendency.

Examples of films that may be used in the present invention include the following:

(1) A monolayer base film construction including polypropylene (as defined above). The resin of the base film preferably contains an antiblock agent at up to 1% by weight, preferably between 0.1 and 0.5% by weight. The antiblock agent may be silica-based such as Syloid 45 (micron-sized synthetic silica), manufactured by W. R. Grace, or silicone-based, such as Tospearl T120 (polyorganosilsesquioxane powder), manufactured by GE. Both surfaces (i.e., the uncoated surface and the surface to be coated) of the base film are preferably oxidatively treated such as by corona or flame treatment. Flame treatment to >50 dynes/cm is preferred. Alternatively, the monolayer base film construction may include propylene heteropolymers that contain less than 3% $C_2$ monomer. Alternatively, the monolayer base film construction may include blends of polypropylene and propylene heteropolymers. The film may contain reclaimed materials (as well known in the art).

(2) A coextrusion multilayer construction including a polypropylene core (with or without reclaimed material). Skin layers may be included on one or both sides made from polypropylene (as defined above). The core layer construction may alternatively include propylene heteropolymers that contain less than 3% $C_2$ comonomer. Alternatively, the core layer construction may include a blend of polypropylene and propylene heteropolymers. The non-coated surface can be polypropylene homopolymer or a polyolefin copolymer and may contain an antiblock agent at, for example, 0.3% by weight of the skin resin. This antiblock agent is not required. The coated side (prior to coating) and non-coated side also may be oxidatively treated, preferably via flame treatment. The coated side can be polypropylene homopolymer or copolymer of polypropylene. The film must be able to accept corona treatment subsequent to the step of MDO. A preferable construction includes using a polypropylene homopolymer with up to 0.3% by weight antiblock agent. The coextrusion need not be limited to three layers. The base film may be, for example, either clear or opaque.

One example of a base film in accordance with the present invention is an extruded film that has an additional layer added by extrusion coating. This film may then be corona treated and coated in a similar manner to the other constructions, noted above.

The coating is preferably based on a water borne urethane or a blend of water borne urethane and a water borne acrylic coating. Antiblock agent may be added at up to a 1% level based on dry component weight. A crosslinking agent may be added to aid in enhancing chemical (including water) resistance. Preferably, the coating is applied to achieve a final coat weight on fully drawn sheets of between about 0.05 lbs./ream and 0.3 lbs./ream, and preferably between 0.1 and 0.2 lbs./ream.

One preferred example of the coating includes Neoresin NeoRez R600 waterborne urethane at approximately 33% solids with W. R. Grace Syloid W300 silica antiblock agent at approximately 0.3% dry weight.

Another preferred example of the coating includes Neoresin NeoRez R600 waterborne urethane at 33% solids, W. R. Grace Syloid W300 Syloid silica antiblock agent at approximately 0.3% by dry weight, and Neoresin NeoCryl CX-100 polyfunctional aziridine crosslinking agent at approximately 1% by dry weight.

Another preferred example is Neoresin NeoRez R600 waterborne urethane at 33% solids at approximately 75% by dry weight, Neoresin NeoCryl A-5045 (45% solids) at approximately 25% by dry weight, and W. R. Grace W300 Syloid silica antiblock agent at approximately 0.3% by dry weight.

A preferred film structure is as follows. The top layer of the final film structure includes Neoresin NeoRez R600 waterborne urethane at approximately 33% solids at approximately 0.1 lbs/ream and W. R. Grace Syloid W300 silica at approximately 0.3%, by dry weight.

The next layer is a skin layer of about 3 gauge of Fina 3571 homopolymer polypropylene (FINA Oil and Chemical Co., Dallas, Tex.). The surface adjacent to the top layer (above) is oxidatively treated (flame or corona treatment).

The next layer is a core layer of about 174 gauge of Fina 3371 homopolymer polypropylene plus reclaim.

The next layer is a skin layer of about 3 gauge of Fina 3574HS homopolymer polypropylene containing 0.25% Tospearl T120. This layer is (or may be) oxidatively treated (flame or corona treatment) on the surface opposite the core.

Another preferred example of the film structure is as follows. The top layer of the final film structure includes approximately 75% by dry weight Neoresin NeoRez R600 waterborne urethane, 25% by dry weight NeoCryl A5045 (to reduce blocking tendency in mill rolls and slit rolls) and 0.3% by dry weight Syloid W300 silica.

The next layer is a skin layer of about 3.8 gauge of Fina 3371 homopolymer polypropylene. The surface adjacent to the top layer (above) is oxidatively treated (flame or corona treated) on the surface opposite the core, and is treated in line before the coating is applied.

The next layer is a core layer of about 192.4 gauge Fina 3371 homopolymer plus about 10% recycled material.

The next layer is a skin layer of 3.8 gauge which contains about 82.5% Fina 3371 homopolymer polypropylene, 15% Fina EOD 03-10 (FINA Oil and Chemical Co., Dallas, Tex.), about 2.5% Schulman ABPP-05-SC (5% synthetic silica based in random copolymer propylene). This layer is (or may be) oxidatively treated (flame or corona treatment) on the surface opposite the core to >50 dynes/cm.

Testing of this construction showed that this film passes appropriate ink tests.

An example of a generic film structure is as follows:

A coating layer, followed by a 3.8 gauge homopolymer layer, followed by a 192.4 gauge homopolymer (including about 10% recycled material) layer and a 3.8 gauge homopolymer layer including about 0.32% Tospearl (polyorganosilsesquioxane powder) plus about 0.11% silica. The surface may be flame oxidatively treated to about 50 dynes/cm.

The films of the present invention have desirable water resistant properties, based on ice chest and pasteurization tests, without the use of a crosslinking agent. This provides operational advantages in that there is no need to be concerned about the pot life of a coating manufactured with crosslinking agents, which degrade when mixed with water.

The films of the present invention have demonstrated improved water resistance (based on ice chest and pasteurization tests) using up to 1% polyfunctional aziridine crosslinking agents in the coating. This is an unexpected result because, for example, the addition of a polyfunctional aziridine at less than 3% in a standard coating process does not give the required water and temperature resistance. A combination of coating composition and process technology, i.e., in-line coating between the MDO and TDO, provides this unique property.

An additional application for these coated films is for a film that has improved lamination strength using waterborne laminating adhesives, UV curable laminating adhesives, or polyethylene extrudate.

While the invention has been described in detail and with reference to specific examples thereof, it will be apparent to one skilled in the art that various changes and modifications can be made therein without departing from the spirit and scope thereof.

What is claimed is:

1. A printable, coated, biaxially oriented film, comprising:
   (a) a polymeric base film having a predominant polymer, and a first and a second side, said predominant polymer being polypropylene; and
   (b) a urethane coating on said first side, said coating having been applied to said base film between a machine direction orientation and a transverse direction orientation of a two step tentering operation.

2. The film of claim 1, wherein the base film additionally comprises a base film antiblock agent.

3. The film of claim 2, wherein the base film antiblock agent is present at up to 1% by weight of the film.

4. The film of claim 2, wherein the base film antiblock agent is present at up to 0.5% by weight of the film.

5. The film of claim 2, wherein the base film antiblock agent is an antiblock agent selected from the group consisting of silica-based, silicone-based, and a blend of silica-based and silicone-based antiblock agents.

6. The film of claim 1, wherein the urethane coating comprises a waterborne urethane dispersion.

7. The film of claim 1, wherein the urethane coating comprises a waterborne urethane dispersion blended with waterborne acrylic dispersions.

8. The film of claim 1, wherein the urethane coating comprises a crosslinking agent.

9. The film of claim 8, wherein the crosslinking agent is present in the coating at up to 1% by dry weight.

10. The film of claim 8, wherein the crosslinking agent is polyfunctional aziridine crosslinking agent at up to 1% by dry weight of the coating.

11. The film of claim 1, wherein the urethane coating comprises a coating antiblock agent.

12. The film of claim 11, wherein the urethane coating comprises up to 1% coating antiblock agent based on dry component weight of the coating.

13. The film of claim 11, including a base film antiblock agent selected from the group consisting of silica-based, silicone-based, and a blend of silica-based and silicone-based antiblock agents.

14. The film of claim 1, including a surface treatment on the first side beneath the urethane coating.

15. The film of claim 14, wherein the surface treatment on the first side comprises an oxidative treatment.

16. The film of claim 1, including a surface treatment on the second side.

17. The film of claim 16, wherein the surface treatment on the second side comprises an oxidative treatment.

18. The film of claim 1, wherein the polypropylene is a polypropylene homopolymer.

19. The film of claim 1, wherein the polypropylene is a copolymer of propylene.

20. The film of claim 1, wherein the polypropylene is a blend of homopolymers and copolymers.

21. The film of claim 1, wherein the base film is a coextruded structure.

22. The film of claim 21, wherein the coextruded structure has at least three layers.

23. The film of claim 21, wherein the coextruded structure includes a core and at least one skin layer.

* * * * *